United States Patent [19]

Kiuchi et al.

[11] 4,092,510
[45] May 30, 1978

[54] MULTIPLE-LOAD INDUCTION HEATING COOKING APPARATUS WITH MEANS FOR ELIMINATING INTERFERENCE BETWEEN TWO OR MORE COMMUTATION CIRCUITS

[75] Inventors: Mitsuyuki Kiuchi; Takumi Mizukawa; Hideyuki Kominami; Keizo Amagami, all of Kadoma, Japan

[73] Assignee: Matsushita Electric Industrial Co., Limited, Japan

[21] Appl. No.: 732,660

[22] Filed: Oct. 15, 1976

[30] Foreign Application Priority Data

Oct. 22, 1975 Japan .................................. 50-127688
Nov. 5, 1975 Japan .................................. 50-133243
Dec. 4, 1975 Japan .................................. 50-144874

[51] Int. Cl.² .............................................. H05B 5/04
[52] U.S. Cl. .......................... 219/10.49 R; 219/10.77; 307/252 M; 307/252 T
[58] Field of Search ............ 219/10.49, 10.77, 10.55 B; 323/24; 307/252 I, 252 M, 252 B, 252 K, 252 N, 252 Q, 252 UA

[56] References Cited

U.S. PATENT DOCUMENTS

| | | | |
|---|---|---|---|
| 3,718,852 | 2/1973 | Bailey | 219/10.77 |
| 3,925,633 | 12/1975 | Partridge | 219/10.49 |
| 3,932,801 | 1/1976 | Peters | 219/10.77 |
| 3,987,268 | 10/1976 | Maeda et al. | 219/10.77 |
| 4,002,875 | 1/1977 | Kiuchi et al. | 219/10.77 |
| 4,010,342 | 3/1977 | Austin | 219/10.77 |
| 4,016,392 | 4/1977 | Kobayashi | 219/10.77 |

*Primary Examiner*—Bruce A. Reynolds
*Attorney, Agent, or Firm*—Robert E. Burns; Emmanuel J. Lobato; Bruce L. Adams

[57] ABSTRACT

A multiple-load induction heating cooking apparatus comprises two or more induction heating commutation circuits each having the junction between its commutating inductor and capacitor manually selectively connected by corresponding one of a plurality of interconnecting switches equal in number to the commutation circuits to form a series-connected LC circuit to a high frequency energy source. The potential at the common point of connection is compared with a reference potential to produce an error signal which is used to control the frequency of the energy source so that the potential at the common point is maintained constant regardless of the magnitude of induction heating loads.

7 Claims, 4 Drawing Figures

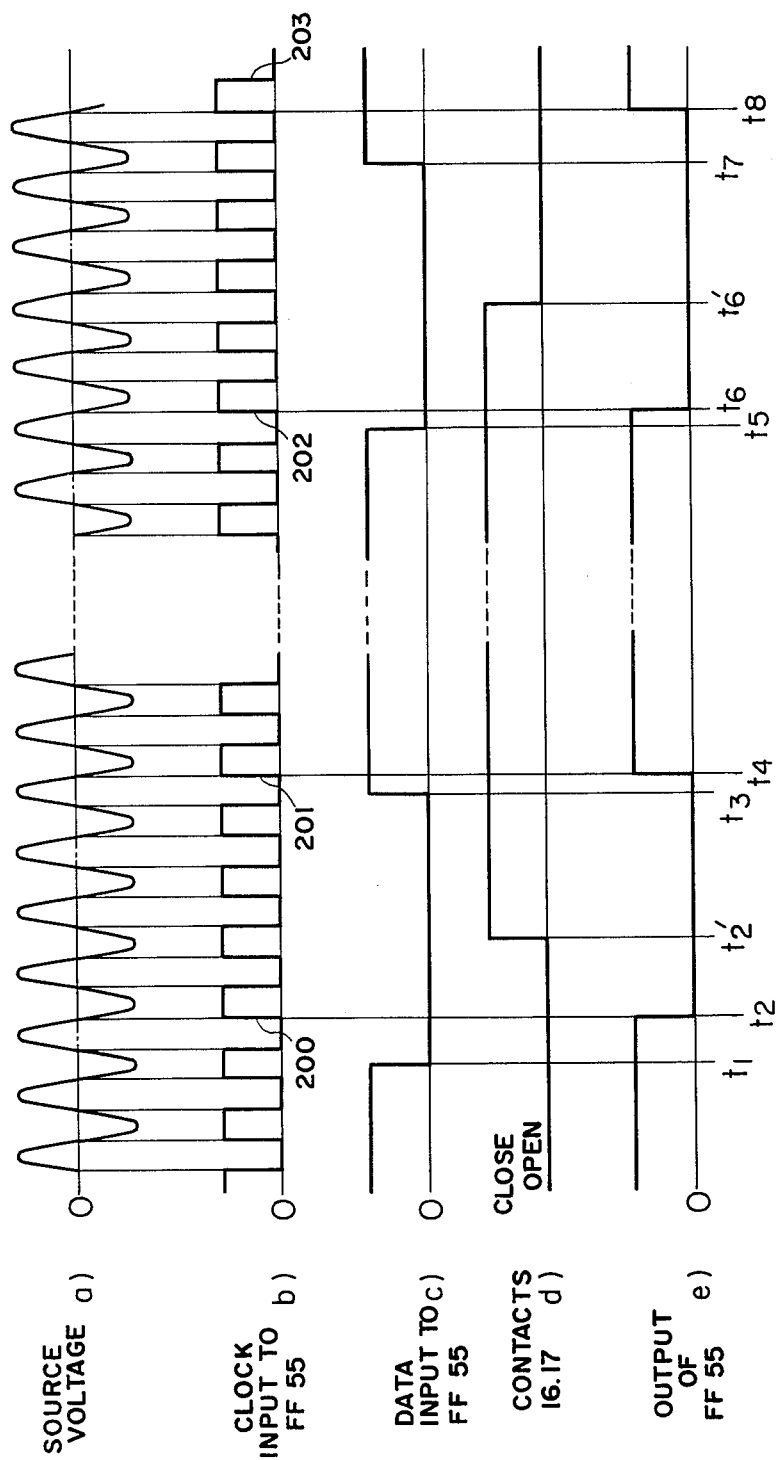

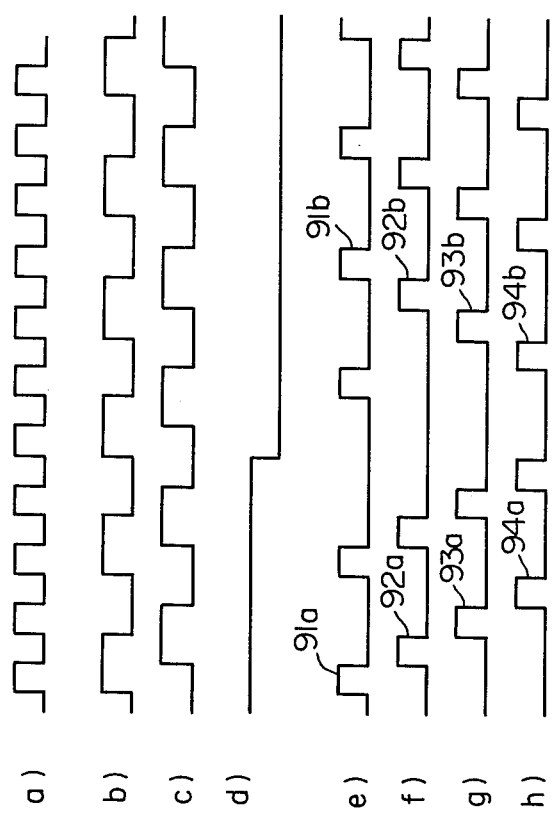

4,092,510

MULTIPLE-LOAD INDUCTION HEATING COOKING APPARATUS WITH MEANS FOR ELIMINATING INTERFERENCE BETWEEN TWO OR MORE COMMUTATION CIRCUITS

BACKGROUND OF THE INVENTION

The present invention relates generally to induction heating cooking apparatus, and in particular to a multiple-load induction heating cooking apparatus.

Attempts have been made to provide multiple-load induction heating using a single high frequency source. U.S. Pat. No. 3,925,633 discloses such induction heating apparatus in which two or more commutation circuits each including an induction work coil and a capacitor are connected in parallel to a high frequency energy source. A gate-controlled interconnecting device is provided between each commutation circuit and the high frequency energy source to control the energization period of the work coil. The high frequency source, which is usually comprised of at least a gate-controlled switching device or power-rated thyristor, is interrupted at a low frequency rate to permit the gate-controlled interconnecting device to automatically turn off to regulate the power transferred to the load. However, undesirable consequences such as interference between two or more commutation circuits is likely to result from the fact that the commutation circuits are connected in parallel to the high frequency source. The problem of such interference becomes particularly severe when the magnitude of a load inductively coupled to one of the work coils is much greater than the load associated with the other work coil, particularly when one of the coils is inductively coupled to a substantial load while no load is placed over the other energized work coil. Such interference draws a large current from the power rated thyristor of the high frequency source and results in instability of the frequency and waveform of the energization current oscillated through the commutation circuits.

SUMMARY OF THE INVENTION

It is a primary object of the present invention to provide a multiple-load induction heating cooking apparatus in which interference between work coils is suppressed to minimum.

It is another object of the invention to provide a multiple-load induction heating cooking apparatus in which radio frequency interference is minimized.

It is a further object of the invention to provide a multiple-load induction heating apparatus which permits the use of low-priced power-rated thyristors for generating high frequency energy.

It is a still another object of the invention to provide a multiple-load induction heating apparatus in which means are provided to ensure against surge current that will result from the fact that the power-rated thyristor is fired when the alternating current source voltage is above the zero voltage potential.

The induction heating apparatus of the present invention comprises a high frequency energy source comprised of at least a bidirectional gate-controlled switching device and a plurality of commutation circuits manually selectively connected to form a series-connected LC circuit to the high frequency source with the midpoint between their L and C components being connected to a common point. The potential at the common point of connection is applied to a comparator for comparison with a reference potential to generate an error signal. A variable frequency pulse generator is provided to supply gating-on pulses to the gate-controlled bidirectional switching device at a frequency which is variable in dependence on the error signal such that the potential at the common point of the commutation circuits is maintained at a constant value. The selective connection of the commutation circuits is effected by a plurality of switches each including at least two normally open contact units and a normally closed contact unit. One of the normally open contact units is used for connecting the commutation circuit to the main terminals of the bidirectional switching device and the other for connecting the junction between its L and C components to the common point. The interconnecting switches are each designed such that the normally closed contact unit opens prior to, and closes subsequent to, the operation or release of the normally open contact units. The normally closed contact units of the switches are series connected to the data input terminal of a D flip-flop having its clock input terminal connected to receive a pulse occuring in step with each half wave pulse of the source voltage. The flip-flop changes state to the binary state of the data input to generate an inhibit signal with a duration beginning and ending in step with the beginning of each half wave pulse of the source voltage. The inhibit signal is used to prevent and permit the supply of the gating-on pulses to the high frequency energy source in step with a zero voltage point of the source voltage. During the transient period of turning on and off of the commutation circuits, the high frequency energy is interrupted to eliminate undesirable interference between the connected commutation circuits and undesirable surge current when the firing of the gate-controlled switching device started after the interruption with the instantaneous value of the source voltage above the zero voltage level.

In accordance with the invention, the frequency of the gating-on pulses is increased in accordance with the magnitude of the load which tends to increase the resonant frequency of the associated commutation circuit, the loss of energy in the induction coil which is inadvertently left unloaded is reduced to a minimum. Furthermore, the commutation circuits are connected to the high energy source during the time the gating-on pulses are interrupted, there occurs no spark across the normally open contacts that carry the energization current.

BRIEF DESCRIPTION OF DRAWINGS

The present invention will be further described by way of examples with reference to the accompanying drawings, in which:

FIG. 3 is a series of waveforms useful for describing the operation of the embodiment of FIG. 1; and FIG. 4 is a series of waveforms useful for describing the operation of the ring counter of FIG. 2.

DESCRIPTION OF THE PREFERRED EMBODIMENT

Figure 1:
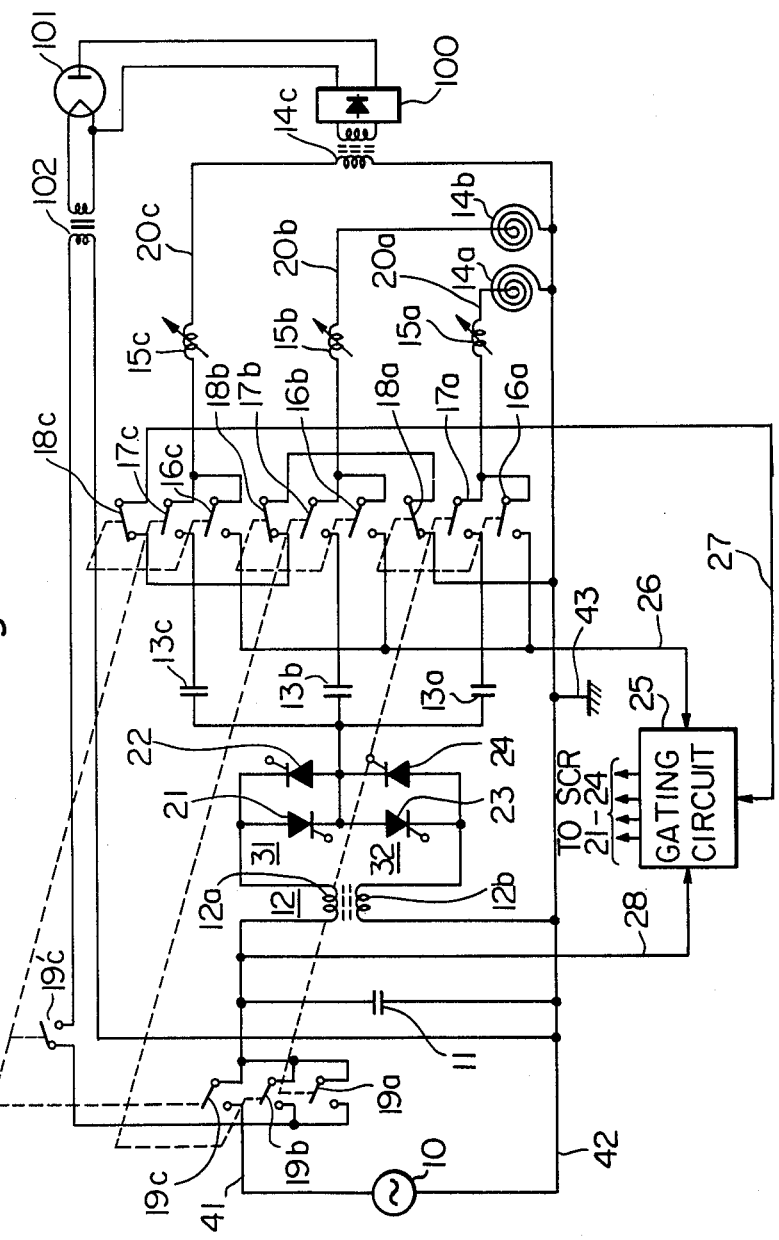
FIG. 1 is a circuit diagram of an embodiment of the present invention.

Referring now to FIG. 1, an embodiment of the present invention is shown. The induction heating apparatus of the invention comprises generally first and second pairs of gate-controlled thyristor switching devices 21, 22, 23 and 24, three commutation circuits 20a, 20b and 20c each comprising a commutating capacitor 13, a commutating inductor including a spirally would flat induction heating coil 14 and a variable inductor 15, and three sets of ganged switching contacts 16, 17, 18 and 19.

The gate-controlled switching devices 21 and 22 in the first pair are connected such that the cathode terminal of each device is connected to the anode terminal of the other to constitute a gate-controlled bidirectional switching device 31 to permit commutating current flow in opposite directions. Similarly, the switching devices 23 and 24 in the second pair are connected in a manner identical to the switching devices 21 and 22 of the first pair to constitute a second gate-controlled bidirectional switching device 32. The first and second bidirectional switching devices 31 and 32 are connected in series through filter inductor 12a and through a set of parallel-connected contact units 19a, 19b and 19c to a first terminal of an AC voltage source 10 at 100 volts, 60 Hz, on the one hand, and on the other hand, through filter inductor 12b to a second terminal 42 of the AC voltage source. The second terminal 42 may be connected to a common bus line 43. A capacitor 11 is connected to the inductors 12a and 12b to provide a path for the commutating current therethrough. The inductors 12a and 12b are coiled around a common core to provide mutual inductance to keep the inductor size to a minimum.

The switching contacts 16 to 19 are constructed as an interconnecting switch unit and operable in the same manner as described in copending United States patent application Ser. No. 509,052 filed Sept. 25, 1974, now U.S. Pat. No. 3987268. Contact units 16, 17 and 19 are of delayed acting, normally open contact type, while contact unit 18 is of an early acting, normally closed contact type. As described fully in the aforesaid copending U.S. patent application, the switch includes a control shaft (not shown) which operates the early acting contact unit 18 to the open circuit condition in response to an actuating force applied in one direction before the delayed acting contacts are caused to operate (closed circuit condition) and returns automatically to the normal circuit condition shortly after the closure of the delayed acting contacts while the actuating force is still being applied for shifting the control shaft from the OFF position to the ON position. Similarly, when an actuating force is applied in the opposite direction for diengaging the control shaft from the ON position, the early acting contact unit 18 is again caused to operate before, and release after, the delayed acting contacts return to the normal circuit condition while the actuating force is still being applied for returning the control shaft to the OFF position. The delayed acting contacts 16, 17 and 19 thus operate and release during the operating period of the early acting contact unit 18, remain in the operated condition (closed circuit condition) after the actuating force is removed, and return to the normal circuit condition during the operating period of the early acting contact unit (see FIGS. 3c and 3d).

Delayed acting contact unit 17a, when operated, connects the commutation circuit 20a to the main terminals (cathode and anode terminals) of the bidirectional switching devices 31 and 32 and contact unit 16a, when operated, connects the junction between the commutating capacitor 13a and the commutating inductor including variable inductor 15a and induction heating coil 14a to a gating circuit 25 through lead 26. Similarly, delayed acting contact units 17b and 17c are provided for connection of the commutation circuits 20b and 20c, respectively, to the main terminals of the bidirectional switching devices, and contact units 16b and 16c are provided for connection of the junction points of the commutation circuit 20b and 20c, respectively, to the gating circuit 25 over the lead 26. Early acting contacts 18a, 18b and 18c are connected in series circuit relationship to apply the potential at the common bus line 43 to the gating circuit 25 through lead 27. It is to be noted that the capacitance and inductance values of the capacitor 13 and inductors 14, 15 are so chosen that under no load conditions the resonant frequency of the parallel-connected commutation circuits is substantially the same as the resonant frequency of a single commutation circuit. Thus, the parallel-connected commutation circuits 20a to 20c act as a series-connected LC circuit tuned to a single frequency regardless of the number of the so connected commutation circuits.

Figure 2:
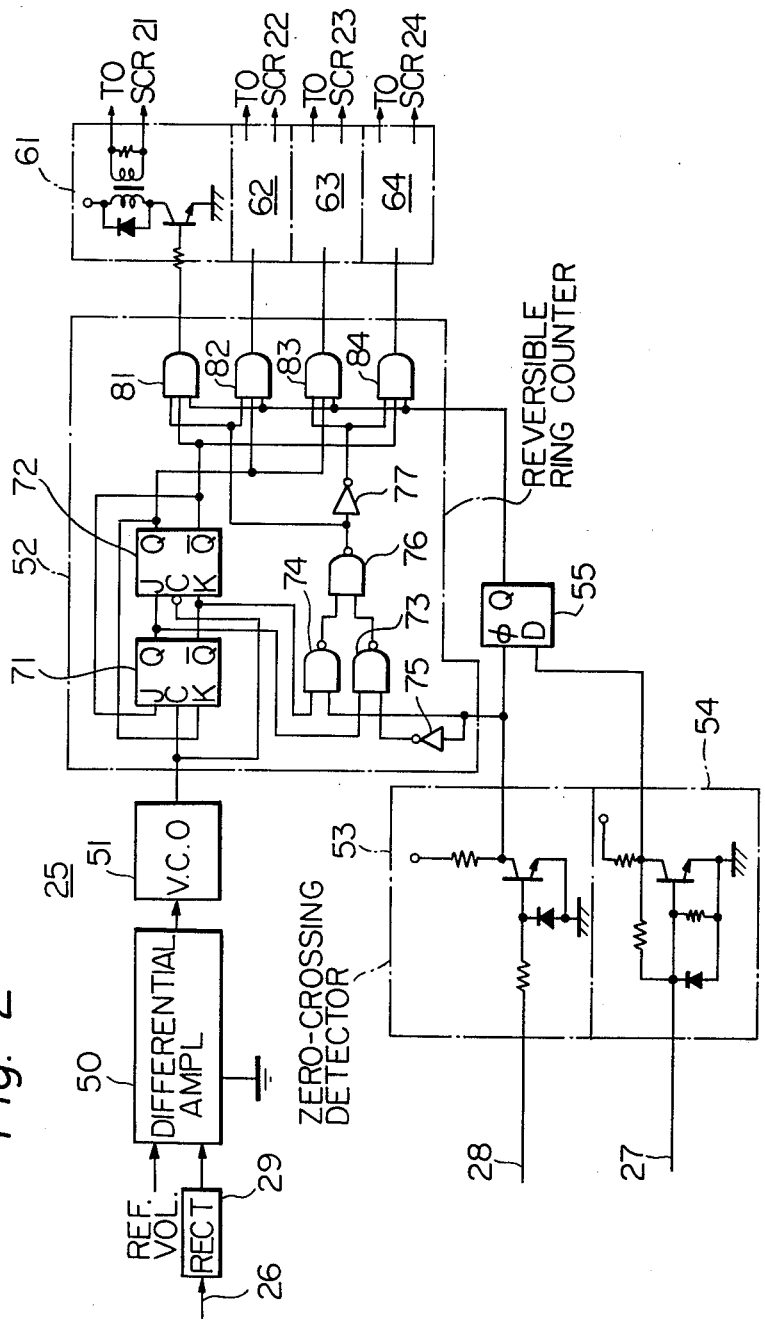
FIG. 2 is a circuit diagram of the gating circuit of FIG. 1.

In FIG. 2 the gating circuit 25 comprises a differential amplifier 50 which is fed with a signal from a rectifier 29 which represents an effective potential at the junction between the commutating capacitor 13 and commutating inductors 14, 15 through lead 26 for comparison with a reference voltage to generate an error signal whose amplitude represents the difference between the two input voltages. The error signal from the comparator amplifier 50 is applied to a voltage controlled oscillator 51 which may be constructed of an integrated circuit chip NE 555 available from Signetic Corporation capable of providing a variable frequency output so that it varies in dependence on the amplitude of the error signal to compensate for the error. When a load is placed over an induction heating coil, power is withdrawn from the commutation circuit and as a result the voltage at the junction will be lowered to a level below the controlled setting value, thereby generating an error signal. In response thereto, the voltage controlled oscillator 51 increases its output frequency from, for example, 19 kHz to 22 kHz, so that overall power delivered to the commutation circuits 20 increases until the controlled setting is reached.

The output from the oscillator 51 is applied to a reversible ring counter 52 which distributes the output pulses from 51 to its output terminals in succession and reverts the order of occurrence of the pulses in response to the occurrence of each zero voltage point of the AC voltage source 10. For this purpose, a zero-crossing detector 53 is provided which is fed with a potential at the input terminal 41 through contacts 19 over lead 28 (FIG. 1) to generate a positive rectangular pulse when the potential at the power input terminal 41 is negative with respect to terminal 42 during a half wave period of the AC voltage source. The outputs from the ring counter 52 are amplified by respective gate drivers 61, 62, 63 and 64 whose outputs are connected to the control gate and cathode of the power thyristors 21, 22, 23 and 24, respectively. Reversal of the order of the gating-on pulses is to permit the thyristors to be gated on in the order of 21, 22, 23 and 24 when terminal 41 is positive with respect to terminal 42 during a half wave period of the AC voltage source 10 and in reversed order when the input polarity is reversed during the subsequent half wave period.

The reversible ring counter 52 comprises a J-K flip-flop 71 having its Q and Q outputs connected to the J and K inputs of a flip-flop 72 with its Q and Q outputs connected to the K and J inputs of flip-flop 71. The clock inputs of both flip-flops are connected together to the output of oscillator 51. The Q and Q outputs of flip-flop 71 are connected to an input of NAND gates 73 and 74, respectively. The output from the zero-crossing detector 53 is connected directly to the other input of NAND gate 74 and through an inverter 75 to the other input of NAND gate 73 to pass the outputs from flip-flop 71 at alternate half wave periods of the source voltage to a NAND gate 76. The output from the NAND gate 76 is connected, on the one hand, to first inputs of AND gates 81 and 82, and on the other hand through an inverter 77 to first inputs of AND gates 83 and 84. Flip-flop 72 has its Q output connected to second inputs of the AND gates 82 and 83 and its Q output connected to second inputs of the AND gates 81 and 84.

A transistor circuit 54 is provided having its input connected to the lead 27 to provide a low-level signal in response to the opening of any one of the switch contacts 18a to 18c. The output from the circuit 54 is connected to the data input of a D flip-flop 55 having its clock input connected to the output from the zero-crossing detector 53. The D flip-flop changes state to the binary state of the data input when a signal occurs at its clock input.

FIG. 3 illustrates a series of waveforms appearing at various points of the embodiment of the invention. FIG. 3a is a sinusoidal voltage waveform appearing across the power input terminals 41 and 42, FIG. 3b showing the output waveform of zero-crossing detector 53.

In describing the operation of the contacts 16 to 18 and their relevant circuits, it is assumed that contact 18a is open during an interval $t_1$ to $t_3$ to energize the apparatus, and as a result the data input to D flip-flop 55 from the output of circuit 54 falls to a low voltage level during the same interval (FIG. 3c). It is assumed that a clock pulse 200 is supplied from the zero crossing detector 53 to D flip-flop 55 at time $t_2$, the output of this flip-flop changes to the low binary state of its data input and remains there until time $t_4$ when a clock pulse 201 occurs subsequent to the release of contact 18 at time $t_3$ (FIG. 3e). Therefore, the D flip-flop 55 changes its output binary state in step with the occurence of each zero crossing point of the voltage of source 10. Since the delayed interval of contacts 16 and 17 is chosen such that they operate or release within the open time of contact 18, the opening of contacts 16 and 17 is ensured to occur at time $t_2'$ during the low level state of the D flip-flop 55 (FIG. 3d). Similarly, the contact 18 is assumed to open again during an interval $t_5$ to $t_7$ to de-energize the apparatus so that the D flip-flop is switched to the low output state during time interval $t_6$ to $t_8$ in step with clock pulses 202 and 203, respectively. The contacts 16 and 17 are released at time $t_6'$ during the low level interval of the D flip-flop 55.

The output from the D flip-flop is connected to the third input of each of the AND gates 81, 82, 83 and 84 to prevent the gate control pulses from passing therethrough when so that when the apparatus is energized the gating-on pulses are inhibited until time $t_4$ after the closure of contacts 16 and 17 and when the apparatus is de-energized the gating-on pulse is terminated at time $t_6$ prior to the opening of contacts 16 and 17.

The operation of the ring counter 52 will be described with reference to FIG. 4. The J-K flip-flop 71 changes to the high output state in step with the rising edge of a clock pulse supplied from the variable frequency pulse oscillator 51 and returns to the low output state at the rising edge of the next clock pulse (FIG. 4a and 4b), while J-K flip-flop 72 changes to the high output state in step with the rising edge of an inverted clock pulse and returns to the low output state at the rising edge of the next inverted clock pulse (FIG. 4a and 4c). Therefore, the Q output from flip-flop 71 (FIG. 4b) appears at the output of NAND gate 76 while the terminal 41 is positive with respect to terminal and the Q output of flip-flop 71 is allowed when the polarity of voltage source is reversed in the next half wave period. The outputs from the AND gates 81 to 84 are the logical products of the Q and Q outputs of J-K flip-flops 71 and 72, resulting in pulses 91a, 92a, 93a and 94a delivered respectively in succession from AND gates 81, 82, 83 and 84 during a half wave cycle of the sinusoidal voltage source and pulses 94b, 93b, 92b and 91b respectively in succession from AND gates 84, 83, 82 and 81 during the next half wave cycle.

In describing the operation, of the circuits of FIGS. 1 and 2, it is assumed that a magnetic cooking vessel is placed over the induction heating coil 14a with the contacts 16a to 19a being operated to energize the coil 14a with the high frequency current, and that input terminal 41 is positive with respect to terminal 42, thyristor 21 will first be fired while the voltage source retains its polarity. The capacitor 13a will be charged to the source voltage through the now conducting thyristor 21 and through the induction coil 14a. While the current that charges capacitor 13a is still flowing, thyristor 22 will be fired by the next pulse 92a from gate driver 62. The charge on capacitor 13a will then be oscillated through the coil 14a to reversely charge the capacitor 13a. The reverse charge on capacitor 13a produce a reverse current through the now conducting thyristor 22 and turns off thyristor 21. Capacitor 13a will be charged in the original direction and then discharged through the thyristor 23 which will be conducted by the third pulse 93a. The fourth pulse 94a fires thyristor 24 to charge capacitor 13a in the reverse direction. This process will be repeated until the voltage source reverses its polarity. When the polarity at the voltage source is reversed during the next half wave period, the firing order is reversed as described previously. The induction coil 14a is energized by the high frequency oscillating current and the electromagnetic energy is withdrawn from the coil 14a to the load placed in overlying relation therewith.

If, in this instance, contacts 16b to 19b are operated to energize the induction coil 14b for simultaneous cooking, the contact unit 18b opens before the closure of contacts 16b, 17b and 19b and disable the AND gates 61 to 64 during the time interval $t_2$ to $t_4$ (FIG. 3e) to prevent the generation of high frequency oscillation in the commutating circuit. During this disabled time interval contacts 16b, 17b and 19b close to bring the commutating capacitor and inductor of the commutation circuits 20a and 20b respectively into parallel connection with each other. Likewise, when an induction coil is de-energized contact unit 18 is operated again for a time interval $t=t_5$ to $t=t_7$ and D flip-flop 55 changes to the low output state at time $t=t_6$ subsequent to time $t_5$ and returns to the high output state at time $t=t_8$ subsequent to time $t_7$ in step with the beginning of each half wave pulse of the source voltage. At time $t=t_6'$ the contacts 16, 17 and 19 return to the normal circuit conditions from the operated conditions. As a result, it is possible to avoid undesirable surge current that occurs during the switching period due to the firing of the thyristors 21 to 24 at the instant the source voltage is above the zero voltage level. Furthermore, the parallel circuit connection of the commutation circuits permits them to operate as a single, series-connected LC resonant circuit tuned to a frequency substantially the same as a single commutation circuit. Therefore, if two coils 14a and 14b are energized with a single load being placed over the coil 14a while leaving the coil 14b without load, the unbalance of loads between the two heating coil would not produce the objectionable interference between the commutation circuits as encountered with the prior art apparatus in which the commutation circuits are not connected to form a single LC circuit. Since the resonant frequency of a commutation circuit greatly increases with the magnitude of a load placed thereover, and the voltage at the junction between the parallel-connected commutating capacitors and the parallel-connected commutating inductors is sensed by the differential circuit for comparison with the reference value, an increase of load will cause the voltage at the junction point or lead 26 to decrease and the output from the differential amplifier 50 will be varied to increase the frequency of the voltage-controlled oscillator 51 until the junction point assumes the original potential level.

By eliminating the surge current and the interference effect between the commutation circuits during switching periods, it is possible to reduce the power rating of the thyristors 21 to 24.

Because of the advantageous feature of the present invention, the induction coil 14c may be comprised of a transformer to step up the voltage developed in the primary winding to generate effectively a high-tension voltage which is rectified by a rectifier 100 into a DC high voltage for application to the anode and cathode terminals of a magnetron 101 to produce radiant energy in the microwave frequency range. The cathode of the magnetron is heated by a current supplied from terminals 41 and 42 through switch contact 19c' and a step-down transformer 102. The microwave energy radiated from the magnetron 101 may be effectively used for heating foodstuffs within a sealed chamber of a microwave oven.

Variable inductors 15a to 15c are used to individually control the currents that energize the coils 14a, 14b and 14c. However, it is preferable to employ a set of elevating mechanisms as shown and described in the aforesaid copending United States application to control the air gap between the bottom of a cooking vessel and the associated induction heating coil 14a or 14b instead of using variable inductors 15a and 15b.

In the foregoing description, the energy source employs a pair of bidirectional gate-controlled switching devices. It is obvious to employ a single bidirectional gate-controlled switching devices instead of the two in case where the gating-on pulses are generated one for each completion of commutation through the commutation circuit and the bidirectional switching device. Further, it is also possible to use a full-wave rectified, unfiltered unidirectional voltage instead of the alternating current source. In this case the bidirectional switching device is replaced with a forward conducting thyristor and diode connected inversely in parallel with the forward conducting thyristor. However, from standpoint of radio frequency interference, it is preferred to use a pair of bidirectional conducting gate-controlled switching devices as shown and described, because it is capable of generating sinusoidal wave energization current free from radio frequency components.

What is claimed is:

1. An induction heating apparatus comprising:
   a. at least one gate-controlled bidirectional switching device having a pair of main terminals connectable in use to a source of low frequency voltage;
   b. a plurality of commutation circuits each including a commutating capacitor and a commutating inductor including an induction heating work coil inductively coupled with a magnetic load to be heated;
   c. means for selectively connecting the commutation circuits in parallel circuit relationship to the main terminals of the bidirectional switching device and junction between the commutating capacitor and the commutating inductor of said parallel-connected commutation circuits to a common point;
   d. means for generating an error signal representative of the difference between the voltage developed at said common point of connection and a reference value; and
   e. means for supplying said gate-controlled bidirectional switching device with gating-on pulses at a high frequency variable in dependence on the error signal such that the high frequency is varied to compensate for the difference between said voltage and the reference value.

2. An induction heating apparatus as claimed in claim 1, wherein said selectively connecting means comprises a plurality of switches each including delayed acting contact units for connecting said commutation circuits in parallel circuit relationship to the main terminals of the switching device to provide commutation of currents through said switching device in opposite directions and said junction to said common point of connection to permit generation of said error signal, and an early acting contact unit operable to become active in response to an actuating force in one direction before said delayed acting contact units become active or inactive and to become inactive in response to an actuating force in the other direction after said delayed acting contact units become active or inactive.

3. An induction heating apparatus as claimed in claim 2, wherein said gate-controlled bidirectional switching device is connected to said source of low frequency voltage by a plurality of parallel-connected contact units each being operable with an associated pair of delayed acting contact units.

4. An induction heating apparatus as claimed in claim 1, further comprising means for interrupting the supply of said gating-on pulses for a time interval beginning at a time prior to, and ending at a time subsequent to, the time of connection of said commutation circuits in parallel circuit relationship and the time of connection of said junction to said common point in step with the occurrence of a zero volt of said low frequency voltage source.

5. An induction heating apparatus as claimed in claim 4, wherein said gating-on pulse interrupting means comprises:
   a zero-crossing detector operable to provide a signal upon the occurrence of a zero volt in said low frequency voltage source; and
   a bistable device having a data input biased at one of two levels in response to the active state of said early acting contact unit, a clock input terminal responsive to the signal from the zero-crossing detector, and an output terminal, and being operable to change the binary level of the output terminal thereof to the binary level of the data input terminal upon the occurrence of the signal at the clock input terminal, whereby the output of the bistable device is at one of two levels during a time interval beginning at the occurrence of a zero volt of said low frequency voltage source and ending at the occurrence of a subsequent zero voltage of said voltage source.

6. An induction heating apparatus as claimed in claim 1, wherein the resonant frequency of said commutation circuits connected in parallel circuit relationship when no load is inductively coupled is substantially the same as the resonant frequency of a single commutation circuit.

7. An induction heating apparatus as claimed in claim 1, wherein said induction coil of one of the commutation circuits comprises a primary winding of a step-up transformer, and further comprising a rectifier connected to the secondary winding of the transformer to provide rectification of a high tension voltage resulting from the stepping up of the commutating current flow through the primary winding of the transformer and through the bidirectional switching device, and a magnetron having cathode and anode terminals connected to receive the output from the rectifier to produce energy at microwave frequencies.

* * * * *